United States Patent
Scheidhauer et al.

(10) Patent No.: US 7,787,708 B2
(45) Date of Patent: Aug. 31, 2010

(54) SYSTEMS AND METHODS FOR RENDERING TEXT WITHIN SYMBOLS

(75) Inventors: Ralf Scheidhauer, Hamburg (DE); Frank Toennies, Saarbruecken (DE)

(73) Assignee: IDS Scheer Aktiengesellschaft, Saarbruecken (DE)

( * ) Notice: Subject to any disclaimer, the term of this patent is extended or adjusted under 35 U.S.C. 154(b) by 1055 days.

(21) Appl. No.: 11/448,103

(22) Filed: Jun. 7, 2006

(65) Prior Publication Data

US 2007/0008343 A1  Jan. 11, 2007

Related U.S. Application Data

(60) Provisional application No. 60/687,853, filed on Jun. 7, 2005.

(51) Int. Cl.
*G06K 9/36* (2006.01)
*G06K 9/72* (2006.01)
*G09G 5/00* (2006.01)

(52) U.S. Cl. .................. 382/284; 382/229; 345/629

(58) Field of Classification Search ......... 382/180–181, 382/189, 197, 229, 284; 345/26, 629, 636
See application file for complete search history.

(56) References Cited

U.S. PATENT DOCUMENTS

| | | | | |
|---|---|---|---|---|
| 4,087,788 A | * | 5/1978 | Johannesson | 382/241 |
| 5,293,469 A | * | 3/1994 | Outa et al. | 345/660 |
| 5,895,475 A | * | 4/1999 | Eisenberg | 715/209 |
| 6,170,000 B1 | * | 1/2001 | Bories et al. | 715/202 |
| 7,152,207 B1 | * | 12/2006 | Underwood et al. | 715/207 |
| 2006/0069635 A1 | * | 3/2006 | Ram et al. | 705/37 |
| 2006/0129417 A1 | * | 6/2006 | Williams et al. | 705/1 |

OTHER PUBLICATIONS

U.S. Appl. No. 11/448,074, entitled "Systems and Methods for Creating Symbols and Rendering Models Using Such Symbols," filed Jun. 7, 2006.
U.S. Appl. No. 11/448,097, entitled "Systems and Methods for Rendering Symbols Using Non-Linear Scaling," filed Jun. 7, 2006.
Marriot, Kim et al., "Fast and Efficient Client-Side Adaptivity for SVG," WWW 2002, May 7-11, Honolulu, Hawaii, USA, ACM, pp. 496-507.
Scalable Vector Graphics (SVG) 1.1 Specification W3C Recommendation Jan. 14, 2002, 9 Basic Shapes, http://www.w3.org/TR/SVG/shapes.html.
Badros et al., "A Constraint Extension to Scalable Vector Graphics," WWW 10, May 1-5, 2001, Hong Kong, ACM, pp. 489-498.

* cited by examiner

*Primary Examiner*—Daniel G Mariam
(74) *Attorney, Agent, or Firm*—Finnegan, Henderson, Farabow, Garrett & Dunner, L.L.P.

(57) ABSTRACT

Systems and methods are provided for rendering symbols with text. In one implementation, the method may comprise selecting a symbol from a repository, selecting text to be combined with symbol, and combining the text with the symbol. To combine the text with the symbol, the method may further comprise combining the text with the symbol according to at least one of inserting text within an defined text box in the symbol, and automatically determining a text box within the symbol to insert the text.

20 Claims, 4 Drawing Sheets

SYSTEMS AND METHODS FOR RENDERING TEXT WITHIN SYMBOLS

CROSS REFERENCE TO RELATED APPLICATION(S)

This application claims the benefit of priority from U.S. Provisional Application No. 60/687,853, entitled "Computerized Systems and Methods for Displaying Objects and File Formats Related Thereto," filed Jun. 7, 2005, the disclosure of which is expressly incorporated herein by reference to its entirety.

BACKGROUND

I. Technical Field

The present invention generally relates to the field of computer graphics and to systems and methods for rendering symbols. More particularly, the present invention relates to computerized systems and methods for rendering text within symbols and graphically modeling processes, such as business processes, using such symbols.

II. Background Information

Many software and consulting companies use tools for strategy, design, implementation and controlling of business processes. A "business process" describes functions or activities that occur in a particular order and that create added value for a company. Since business processes are crucial to performance, companies often spend a significant amount of time and effort to design efficient business processes. Further, in order to efficiently design business processes, many companies use modeling tools. A "modeling tool" may include software and/or other computerized systems that can be used to plan a process. In general, modeling tools may depict, analyze, and optimize business processes. Often times a single tool can be used for modelling different business processes.

Some modeling tools allow users to model a business process in a graphical form using symbols to represent a logical sequence of steps in a process. Many of these tools contain symbols that represent the objects in a model. A user can create and modify models using a toolset built into the modeling tool or provided separately. Each model contains information about which objects and which connections are visualized in that model. For each object, the model stores information about which symbol is used to visualize the object, its position on the canvas, its size, and its style.

One example of a platform for building business processes is the ARIS Platform provided by IDS Scheer AG (Saarbruecken, Germany). The ARIS Platform provides a tool portfolio for designing, implementing, and controlling business processes. Within the ARIS platform is a repository that contains a graph and the nodes within the graph are called objects. The models are graphical representations of parts of the graph. Objects are represented in the models using symbols. A user may use symbols included with ARIS or create symbols of his own using an AMF editor that is part of the ARIS system.

Many users may require small modifications of the default symbols from a modeling tool installer or vendor, or even modified or customized symbols stored in a repository. For instance. the user may need to change one or more attributes or properties of a symbol, such as adding text within the symbol. Further, different text may need to be added to the symbol depending on the instance of the symbol to be rendered.

In prior solutions, if a user wanted to render a symbol with text, the size of the text may be limited since the text may not always fit inside the symbol. As a result, without a size restriction, the text would overlap the boundaries of the symbol. In other solutions, if the text entered by a user did not fit into on line, line breaks or wrapping of the text would be automatically performed to fit the text within the symbol. However, even with these solutions, if the text was too long and did not fit completely into the symbol, the words that did not fit into the symbol would be replaced with " . . . " or would otherwise be abbreviated.

In view of the foregoing, there is a need for improved systems and methods for generating rendering a symbol, including a symbol with text contained within the boundaries of the symbol. Moreover, there is a need for improved systems and methods for rendering a symbol with text, including the ability to fit as many lines of text as possible into the symbol and to use a minimum number of line breaks.

SUMMARY

Systems, methods and computer-readable media consistent with embodiments of the present invention may obviate one or more of the above and/or other issues and drawbacks. Consistent with an aspect of the invention, computerized systems and methods may be provided for rendering symbols with text. The text to be combined with a symbol may be rendered completely within the boundaries of the symbol, while computationally doing so with as many lines of text as possible and with the minimum number of page breaks.

In accordance with one embodiment, a method is provided for rendering a symbol, wherein the symbol comprises text to be rendered within the boundaries of the symbol. The method may comprise selecting a symbol from a repository, selecting text to be combined with the symbol, and rendering the text combined with the symbol. To combine the text with the symbol, the method may further comprise combining the text with the symbol according to at least one of inserting text within an defined text box in the symbol, and automatically determining a text box within the symbol to insert the text.

In one embodiment, the method comprises creating a customized symbol based on the result of combining the text with the symbol.

Consistent with another embodiment of the present invention, a system is provided for rendering symbols. The system may comprise a processor, and a memory, wherein the memory comprises instructions that are configured to cause the processor to perform a method. The method may comprise selecting a symbol from a repository, selecting text to be combined the symbol, and rendering the text combined with the symbol. To combine the text with the symbol, the method may further comprise combining the text with the symbol according to at least one of inserting text within an defined text box in the symbol, and automatically determining a text box within the symbol to insert the text.

For example, embodiments of the invention can be implemented for rendering symbols with non-linear scaling for any graphic context or display of information, including electronic presentations such as Windows PowerPoint.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
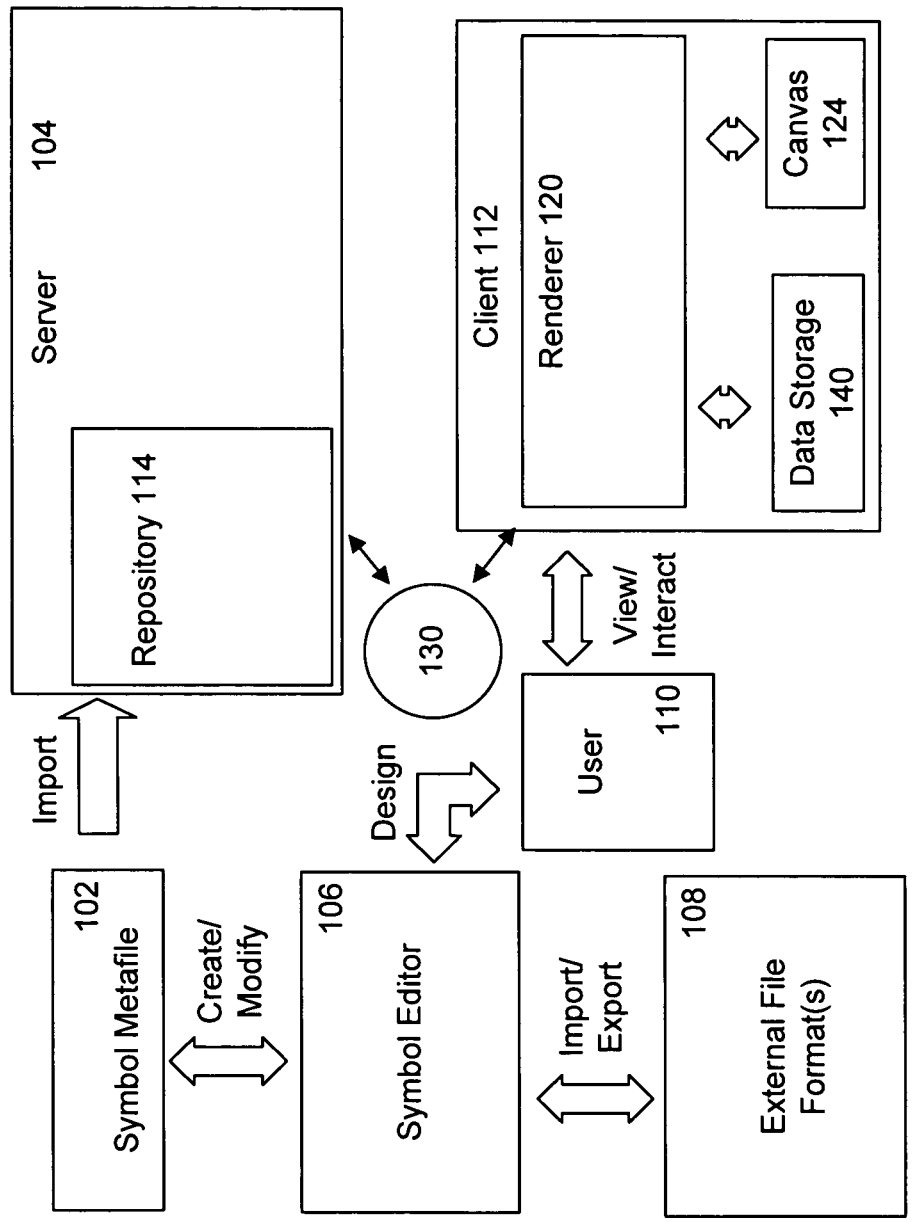
FIG. 1 illustrates an exemplary system environment, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with embodiments of the invention enable a user to render a symbol with text contained within the boundaries of the symbol. Each symbol may be stored in a symbol repository and, together with other symbols or graphics, used to render models or other information on a canvas. As used herein, the term "canvas" refers to any medium for displaying information, including computer screens and other electronic display panels (e.g., an LCD or plasma panel). The "models" may be representative of business processes or other processes.

In embodiments of the present invention, a "symbol" may depict a unique object in a graphical form. A symbol may include a text description. The text description may serve any purpose, such as naming or describing a function performed by an object that is graphically represented by the symbol. An "object" refers to a concept that can be expressed or implemented as part of a process, such as a business process.

Consistent with embodiments of the present invention, a modeling tool may be implemented to provide a user with a workspace to create, modify and update symbols. Symbols may be stored and available for user selection from a symbol repository. The symbol repository may be accessed through a portion of a work space included in a graphical user interface. For example, the symbol repository may include symbols that have been arranged or categorized based on color groups. In one embodiment, the symbol repository comprises a standardized set of symbols provided by a software vendor, installer or other source. A user may modify one or more selected symbols from the symbol repository to create new symbols with text. Once a user has modified a symbol, the new symbol may be saved for later modification in the symbol repository.

FIG. 1 depicts an exemplary system environment 100, consistent with an embodiment of the present invention. Several of the components in system 100 can be implemented with, for example, the ARIS system architecture available from IDS Scheer. Further, the ARIS metafile format (AMF) may be used to define graphical symbols, including symbols containing text. As will be appreciated by one skilled in the art, however, embodiments of the invention are not limited to the ARIS environment and/or AMF, and may be applied in other environments, including computerized or software-based environment with modeling and/or graphical tools. As used herein, the term "software" encompasses any and all types of software, including computer software, computer program products, and program modules and components, including business and financial software applications and components.

As shown in FIG. 1, system 100 may include a symbol metafile 102, a server 104, a symbol editor 106, external file format(s) 108, a user 110, and a client 112. User 110 may operate client 112. Symbol metafile 102 may be based on, for example, an ARIS metafile of the ARIS system. Further, symbol editor 106 may comprise the AMF editor of the ARIS system, and client 112 may be the ARIS client of the ARIS system.

Symbol metafile 102 may comprise one or more XML-based files in vector graphic format. Symbol metafile 102 may provide for the definition of graphical symbols used in system 100. By way of example, the format of the symbol metafile 102 may use a small subset of the Scaleable Vector Format (SVG) language and include various system specific extensions, for example, ARIS specific extensions to these standard elements. A symbol may be composed by graphic primitives called "elements." Each element may have its own set of attributes that define the visual and logical representation of the element. Each symbol may be defined through a combination of such elements. In accordance with an embodiment of the invention, the symbol format may define the following primitive graphic elements: rectangles, rounded rectangles, lines and polygons, ellipses and circles, and bitmaps, including various graphics. The text is an external data source, and is therefore fetched from the repository and combined with the symbol. The symbol holds the position of the text. For purposes of illustration, the following table shows an exemplary XML markup for an AMF symbol (shown to the right of the XML-markup):

```
1   <?xml version='1.0'?>
2   <svg amf:innerBoundingBox="22,20,174,96"
3       xmlns="http://www.w3.org/2000/svg" version="1.1"
4       xmlns:amf="http://www.ids-scheer.de/aris/amf/ns.htm"
5       xmlns:svg="http://www.w3.org/2000/svg"
6       xmlns:xlink="http://www.w3.org/1999/xlink">
7
8       <svg:rect
9         fill="#96ff96"
10        amf:fill-replaceable="1"
11        stroke="#000000"
12        stroke-width="1"
13        stroke-linecap="round"
14        amf:stroke-replaceable="1"
15        x="0" y="0"
16        width="249" height="155"
17        amf:rectRoundRadius="60"
18        amf:rectRoundingFixed="true"
19      />
```

```
-continued
20      <svg:polygon
21          fill="#ffff00"
22          amf:fill-replaceable="false"
23          stroke="#000000"
24          stroke-width="1"
25          amf:stroke-replaceable="false"
26          points="187,137 211,97 230,137 "
27          amf:fixedCorner="point(249,155)"
28      />
29  </svg>
```

As shown by the above example, the XML-markup for the symbol includes a header (lines 1-6) followed by the two elements constituting the symbol (i.e., a green-filled rectangle (lines 8-19) and a yellow-filled polygon (lines 20-28).

By way of example, the following table summarizes AMF extensions that may be added to standard SVG elements to implement the components of FIG. 1 based on an ARIS system environment:

| Extension Attribute | Description | Valid Values | Default |
| --- | --- | --- | --- |
| stroke-replaceable | Configures the AMF renderer to use an user defined stroke when rendering the tagged graphic primitive object. The user defined stroke itself may override stroke color, stroke style, stroke strength, stroke dash-array etc. | 1) Numerical integer values with a value above 0. 2) Boolean value "true" or "false" Numerical values configure the renderer to use the external user defined stroke with the given number (if the renderer is configured with a set of user defined strokes) "false" configures the renderer to ignore any user defined strokes and only use the stroke that's defined inside the AMF file. "true" is a synonym for "1" and is only supported for backward compatibility. | "false" |
| fill-replaceable | Configures the AMF renderer to use the user defined brush of the given value when rendering the tagged graphic primitive object. The user defined brush itself describes a set of attributes that determines the for example fill color, fill style, fill transparency etc. | 1) Numerical integer with a value above 0. 2) Boolean value - "true" or "false" Numerical values configure the renderer to use the external user defined brush (the brush defines fill color, fill pattern, fill transparency) with the given number (if the renderer is configured with a set of user defined brushes) "false" configures the renderer to ignore any user defined brushes and only use the brush that's defined inside the AMF file. "true" is a synonym for "1" and is only supported for backward compatibility | "false" |
| fixedCorner | 1) Any attribute value other than "none" describes the surrounding graphical element as not scaleable. 2) The value of this attribute defines the anchor point that is used by the renderer to position this non scaleable symbol. | One value out of the following tree categories: 1) "point([x cord], [y cord])" that defines the coordinates of the anchor point. The coordinates are logical coordinates and therefore relative to the upper left corner of the symbol 2) A symbolic constant that represents a well known point inside the AMF. Valid constants are: a. "lowerLeft" b. "lowerRight" c. "upperLeft" d. "upperRight" e. "center" The constants "lowerLeft, lowerRight", "upperLeft" and "upperRight" represents the coordinates of the corresponding corners of the AMFs outer bounding box, the constant "center" | "none" (normal linear scaling) |

-continued

| Extension Attribute | Description | Valid Values | Default |
|---|---|---|---|
| | | represents the coordinates the center of the overall AMF has. "none" - configures the render to scale the surrounding graphical element linear. (normal scaling) | |
| rectRoundRadius | This attribute is only valid for <svg:rect .. /> elements. The standard SVG rect element describes a rectangular share of given with and height. However, is doesn't provide a mechanism to render rounded rectangles. This attribute configures the renderer to round every corner of the defining rectangle with an circle of the given radius | Numerical integer with a value equal to or above zero. The value is interpreted as an circle radius. every corner of the rectangle is replaced with the corresponding quarter r of a circle with the given radius. The radius is specified in logical coordinates. | 0 (normal rectangle, no rounded corners) |
| rectRoundingFixed | This attribute is only valid for <svg:rect .. /> elements that represents a rounded rectangle (that also have a valid "rectRoundRadius" attribute) It defines if the rounding radius of rectangle should be increased if the rectangle is scaled to a width/height that is extending the default width. | 1) "true" The rounding radius of the tagged rectangles is fixed and will not scaled by the renderer even if the surrounding AMF is scaled. 2) "false" the rounding radius of the rectangle is scaled linearly according to the horizontal and vertical scale factors of the surrounding Symbol. | "true" |
| innerBoundingBox<[1–9]*> | Every AMF Symbol can have one or more explicit inner bounding boxes. This boxes are used by the renderer to determine the graphical boundaries of textual attributes that may be renderer inside the AMF Symbol. One innerBoundingBox attributes defines one rectangle of these Rectangles. The first inner rectangle is defined by the innerBoundingBox attribute, additional boxes can be defined by the innerBoundingBox [N] command. | Each inner bounding box is represented by the upper left corner oft the box and its horizontal and vertical extend. innerBoundingBox = "22, 20, 174, 96" represents a box starting at the logical coordinates X = 22, Y = 20 that is 174 logical coordinates wide and has a height of 96 logical coordinates. The logical coordinate (0/0) represents the top left corner from the outer bounding box. | If this attribute isn't set the renderer will automatically calculate the inner box according to a predefined algorithm, such as that described herein with reference to FIG. 4. |

In addition to SVG or SVG with extensions, symbol metafile 102 may be based on other conventional and known vector graphics or metafile formats, such as cgm (computer graphics metafile), dpx (digital picture), igs (initial graphics), and swf (small web format).

Symbol editor 106, which may be implemented as a software component running on a computer or provided with the software components executed by client 112 (see below), may allow users to create or modify symbols according to his or her own needs or other requirements. In one embodiment, symbol editor 106 enables user 110 to select and modify existing symbols in repository 114 and to combine such symbols with text.

Changes to existing symbols may include, for example, the addition of company logos to a symbol or the changing colors or shades in a symbol. Additionally, as described above, it may be possible to reuse already existing graphics or symbols stored in external file format(s) 108. For example, symbol editor 106 may enable user 110 to import graphics stored in GIF, JPG, BMP and EMF (a Microsoft proprietary vector graphics file format) to create customized symbols that are defined via symbol metafile 102 and stored in repository 114 for use in system 100. In yet another embodiment, user 110 may create a completely new symbol using graphics tools and/or a library of primitives provided by symbol editor 106 to define the elements of the symbol. Once a new symbol is created, symbol editor 106 may save the new symbol to the repository 114.

In one embodiment, symbol editor 106 may comprise a general purpose computer (e.g., a personal computer, network computer, server, or mainframe computer) having a processor (not shown) that may be selectively activated or reconfigured by a computer program to perform one or more methods for allowing the user to create symbols or modify existing symbols, as described above. Alternatively, symbol editor 106 may be implemented with software that is executed by client 112.

As further shown in system 100, server 104 and client 112 may be connected to a network 130. Network 130 may facilitate the communication between these components, including the exchange of instructions, graphics and other data. Further, network 130 may support the operation between client 112 and server 104 according to a typical client-server relationship. One of skill in the art will appreciate that although one server and client are depicted in FIG. 1, any number of servers and clients may be provided. Furthermore, one of ordinary skill in the art will recognize that functions provided by one or more components of system 100 may be combined.

As indicated above, network 130 provides communications between the various entities in system 100, such as server 104 and client 112. Network 130 may be a shared, public, or private network and encompasses a wide area or local area. Further, network 130 may be implemented through any suitable combination of wired and/or wireless communication networks and may comprise a local area network (LAN), a wide area network (WAN), an intranet, or the Internet. Communication between server 104 and client 112 may be implemented using conventional protocols or technology, such as TCP/IP.

Server 104 may comprise a general purpose computer (e.g., a personal computer, network computer, server, or mainframe computer) having a processor (not shown) that may be selectively activated or reconfigured by a computer program to perform one or more methods consistent with the present invention. Server 104 may also be implemented in a distributed network. Alternatively, server 104 may be specially constructed for carrying-out methods consistent with the present invention. Furthermore, server 104 may include a repository 114 that comprises a database that stores data defining basic graphical primitives or elements of symbols used in system 100. Repository 114 may also comprises a database that stores data for defining default values for the external properties (fill color, line widths, shading, etc) of the symbols, as well as data reflecting customized symbols based on user-defined external properties. Consistent with an aspect of the invention, each such customized symbol may be stored as a different instance in the repository 114.

As disclosed herein, symbols stored in server 104 may be used by renderer 120 of client 112 for any purpose, such as to generate and render models. Each model may be defined by data that is stored in repository 114 of server 104. A toolset provided in renderer 120 or by other software (e.g., a model editor) may enable user 110 to create each model by, for example, selecting symbols and/or symbol instances to be included in the model, as well as defining the layout, arrangement and/or relationship between the various symbols in the model.

Consistent with embodiments of the invention, client 112 may be any type of device for communicating with server 104 over network 130. For example, client 112 may be a personal computer, handheld device, or any other appropriate computing platform or device capable of exchanging data with network 130. Client 112 may include one or more hardware and/or software components, such as renderer 120, data storage 140, and canvas 124. Further, program modules for implementing renderer 120 are discussed in further detail with respect to FIG. 2.

Figure 2:
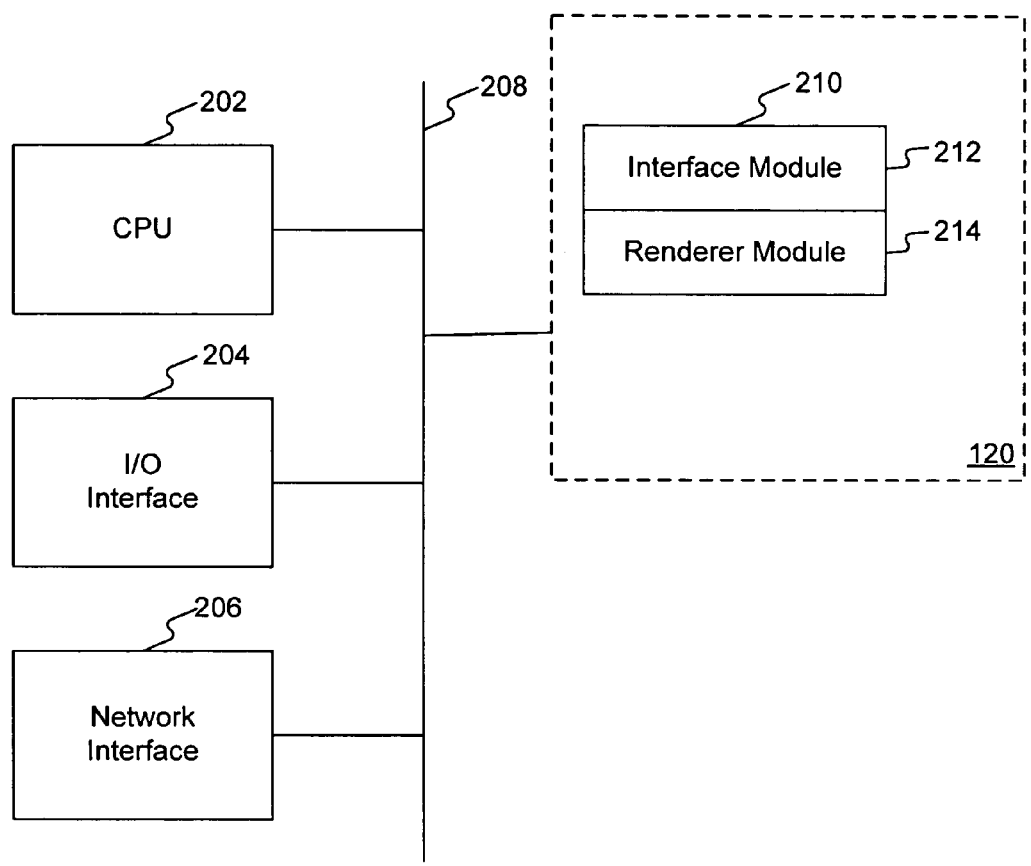
FIG. 2 is an exemplary hardware and software architecture, consistent with an embodiment of the present invention.

FIG. 2 shows exemplary hardware and software architecture related to renderer 120, consistent with an embodiment of the present invention. The software components of FIG. 2 (interface module 212 and renderer module 214) may be packaged as part of the software systems or subsystems of renderer 120. The hardware devices of FIG. 2 (CPU 202 I/O interface 204, network interface 206, bus 208, memory 210) may be implemented as part of a computer or other hardware of client 112.

As shown in the example of FIG. 2, the hardware architecture may include at least one central processing unit (CPU) 202, an I/O interface 204, a network interface 206, and a memory 210. Memory 210 may be implemented as part of data storage 140 or otherwise provided separately as part of client 112. CPU 202 may execute instructions associated with the software processes contained in memory 210 and transmit results to other subsystems of renderer 120 or client 112 over a high speed interconnect or data bus 208. I/O interface 204 is an interface that may be used to couple renderer 120 to devices such as a keyboard, a mouse, a display device, and any other I/O device useful to user 110 in operating and managing renderer 120, as will be appreciated by one skilled in the art. Further, network interface 206 may be used to communicate with network 130 (FIG. 1).

To render symbols that include or are combined with text, memory 210 may store executable or programmed instructions in the form of one or more software modules 212 and 214. Software modules 212 and 214 may be written using any known programming language. As shown in FIG. 2, memory 210 includes an interface module 212 and a renderer module 214.

Interface module 212 may comprise programmed instructions for causing the display of repositories of symbols on canvas 124 for use modifying or creating symbols with text. Renderer module 214 may have program instructions that, when executed, render symbols according to the user-specified criteria, as will be described further below. Renderer module 214 may use data from symbol metafile 102 and stored in repository 114 to render a symbol on canvas 124. Additionally, or alternatively, render module 214 may use x and y coordinates defined by a user that specify where to draw a symbol on canvas 124, and/or sx and sy scaling factors defined by a user that specify whether a symbol is to be resized (e.g., drawn stretched or shrunken in the x and y directions). Moreover, renderer module 214 may also exclude from scaling any elements specified by a user when rendering a symbol.

Figure 3:
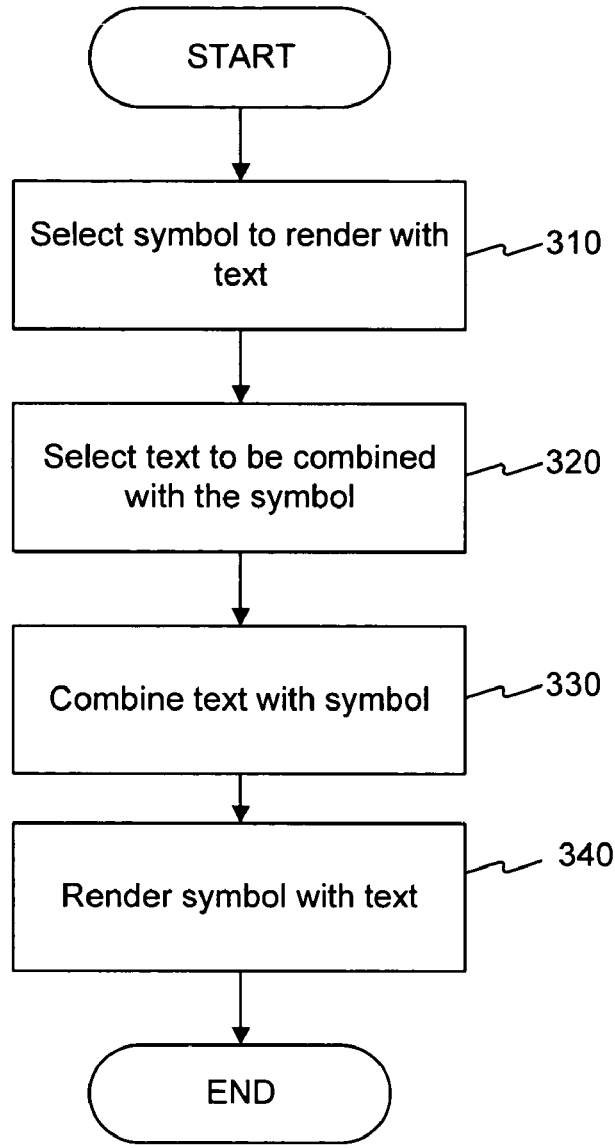
FIG. 3 is a flow diagram of an exemplary method for creating and rendering symbols with text, consistent with an embodiment of the present invention.

Referring now to FIG. 3, a flow diagram is provided of an exemplary method for creating and rendering symbols with text, consistent with an embodiment of the present invention. As will be appreciated from the foregoing description of FIGS. 1 and 2, a symbol including text entered or otherwise identified by a user may be saved to repository 114. Such a symbol may be used for any purpose. For instance, a model or other graphic may be rendered with the symbol, when that symbol is taken alone or in combination with other symbols in repository 114. As further described below, the exemplary method of FIG. 3 allows a symbol to be rendered with text included within the symbol. Aspects of the exemplary method of FIG. 3 is explained with regard to the exemplary diagram of FIG. 4.

At the start of the process, a user (e.g., user 110) may first select a symbol (step 310). The user may either select a symbol from a repository, such as repository 114, or may create a new symbol from scratch (e.g., by using symbol editor 106, etc) to provide the selected symbol. Repository 114 may comprise standardized symbols from a software vendor, installer or other source, and may also include previously stored or modified symbols, including previously created customized symbols by the user.

The user may then select the text to insert into the symbol (step 320). The user may select the text to insert using a number of options. For example, the user may insert text already stored in repository 114 into the symbol. The user may also manually input new text for the symbol. For instance, renderer 120 may provide the user with one or more graphical user interfaces, including text entry fields and drop down menus for instance, that allow a user to specify the text to be combined with the selected symbol.

To further illustrate, assume that the user has chosen a symbol from repository 114. The user may then specify a name, label or other text to be placed inside the symbol. The user may either specify this text from repository 114, where the text (such as a company name) is stored as a text file, or the user may type and enter the text via a keyboard or other input device. Symbol editor 106 may then combine the text with the symbol (step 330), as described in detail below. Once symbol editor 106 has combined the text with the symbol, symbol metafile 102 may import the data defining the symbol with the combined text to repository 114. Thereafter, renderer 120 may render the symbol with the text (340).

Combining the text with the symbol may be performed in accordance with one more embodiments. In one embodiment, editor 106 may allow a user 110 to explicitly defining a box within the symbol to insert text. The text box within the symbol may be defined when the user is creating or selecting the symbol (cf. step 310, FIG. 3). The explicit text box may be defined by extension data of the symbol metafile 102. For instance, each symbol may be defined with an extension "innerBoundingBox" (see exemplary table of SVG extensions above). As with AMF, this symbol format allows a user to optionally define one or more inner text boxes (i.e., a set of rectangles $R_1, \ldots, R_n$) into which text is rendered. If a first rectangle $R_i$ is filled up with the specified text and more text exists to insert into the symbol, the next rectangle $R_{i+1}$ may be used. In one embodiment, the user can define in which order the text flows through the rectangles. A symbol may contain as many rectangles as a user defines to hold the text. For example, when a user creates or modifies a symbol using editor 106, the user may specify that the symbol includes a set number of rectangles to hold text. When creating the symbol, the user can specify whether to set the "innerBoundingBox" extension for the symbol. If this extension is not set, then another process may be implemented to determine inner text box or boxes. For instance, in accordance with another embodiment, the renderer 120 may automatically and/or dynamically determine an inner box according to a predetermined algorithm, such as that described below with reference to FIG. 4. If the user does set this extension, the symbol is saved with this extension in the repository 114.

Figure 4:
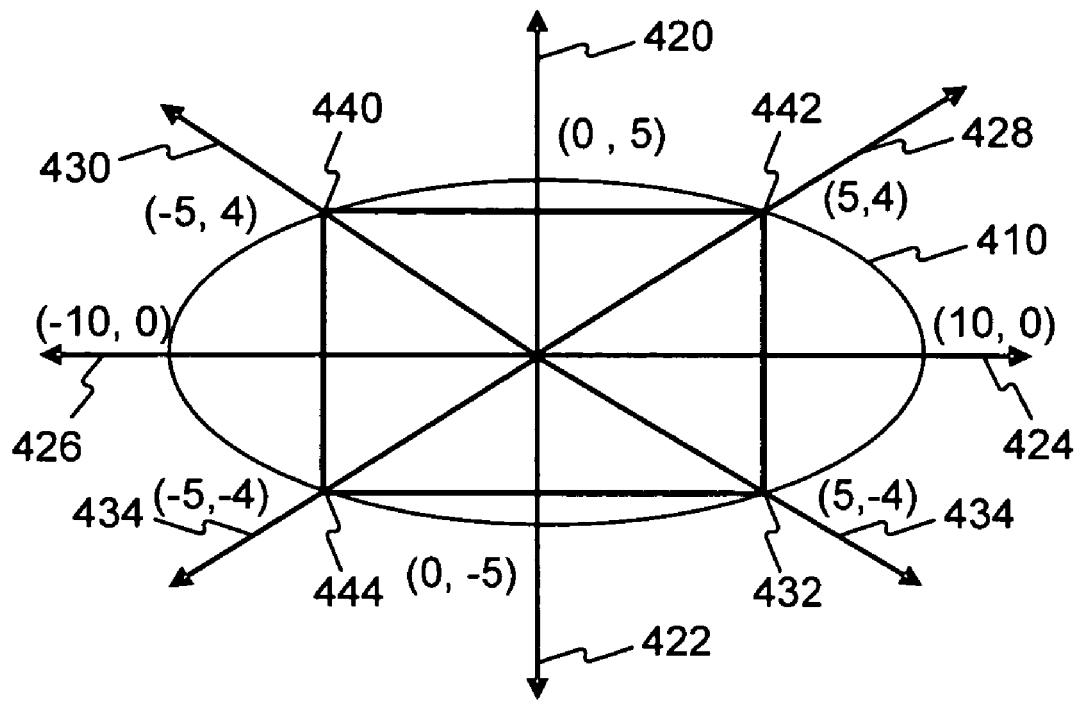
FIG. 4 is an exemplary diagram related to a process for automatically determining a text box within a symbol, consistent with an embodiment of the present invention.

Consistent with an embodiment of the invention, if no text boxes are defined explicitly in the symbol format when the symbol is created, renderer 120 may automatically determine an inner box dynamically for the symbol when rendering the symbol on the canvas 124. Renderer 120 may first determine the center C of the symbol 410 (relative to the symbols bounding box). The center of the symbol may comprise of an x and y coordinate defining where the center of the symbol lays on the canvas. By way of example, the center of the symbol in FIG. 4 is (0,0). Then renderer 120 may then determine eight direction vectors from the center of the symbol, including north 420, south 422, east 424, west 426, northeast 428, northwest 430, southeast 432, and southwest 434, as shown by the arrows in FIG. 4. The eight direction vectors are each drawn from the center of the symbol until a border of the symbol is intersected. Each of the eight directions is a vector from the center of the symbol to the edge of the symbol in those eight directions.

In the example FIG. 4, north 420 is at (0, 5), south 422 (0, −5), east 424 (10, 0), west 426 (−10, 0), northeast 428 (5,4), northwest 430 (−5, 4), southeast 432 (5, −4), and southwest 434 (−5, −4). From these eight intersection points, renderer 120 may derive the four corners of the rectangle, 440, 442, 444, and 446 by taking minimum values of the corresponding x and y coordinates of the eight direction vectors. Therefore, the minimum values of the x and y coordinates of the eight direction vectors in FIG. 4 are northeast 428 (5,4), northwest 430 (−5, 4), southeast 432 (5,−4), and southwest 434 (−5,−4).

In one embodiment, once the four corners of the rectangle are determined, symbol editor 106 may automatically determine the number of lines needed to render the text inside the rectangle. The text is stored as ASCII in the repository 114. The repository stores font information for each character of text. The font information includes the height of the font. The height is attached to the font. Renderer 120 determines the number of lines needed to render the text by using the height of the font as well as the length of the text, and the width of the symbol. Renderer 120 may then determine the minimum number of line breaks (i) needed to fit the text inside the rectangle. Renderer 120 may also set the center of rectangle as the center of the symbol and set the height of the rectangle as the minimum number of lines (i) times the height of one line of text. The height of one line of text is determined by the height of the font. Renderer 120 may then set the width of the rectangle as the maximum width of a rectangle with the given height and center, that fits completely into the symbol. Using this process, renderer 120 may create the smallest possible rectangle to fit the text specified by the user. Once the rectangle is created, the text specified by the user is rendered inside the symbol. The new symbol with the text is then saved to the repository 114.

In order to perform steps 310-340, one or more graphical user interfaces (GUIs) (not pictured) may be provided to assist the user in selecting a symbol and entering text and other data to define or modify elements of the symbol.

Other features may be provided for rendering symbols with text, consistent with embodiments of the present invention. For example, in one embodiment an optimization process may be provided. In particular, in order to determine that the text even fits into one single line and does not extend the symbol itself, the renderer can reduce the height of the rectangle and increase its width, and may save line breaks.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with embodiments of the present invention also include computer readable media that include program instruction or code for performing various computer-implemented operations based on the methods and processes disclosed herein. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of rendering a symbol combined with text, the method comprising the following steps performed by a processor:
   selecting a symbol from a repository;
   providing text based on input from a user;
   combining the text with the symbol, wherein combining the text with the symbol comprises:
      automatically determining a text box within the symbol based on at least one characteristic of the text; and
   rendering the text combined with the symbol on a display, wherein the text is rendered inside the text box.

2. The method of claim 1, further comprising:
   defining one or more text boxes to insert into the symbol, wherein the text is inserted into the one or more boxes.

3. The method of claim 1, wherein automatically determining the text box further comprises:
   determining the center of the symbol.

4. The method of claim 3, further comprising:
   determining eight vectors from the center of the symbol, wherein the eight vectors are each a vector from the center of the symbol to the edge of the symbol in one of eight directions.

5. The method of claim 4, wherein the eight directions are north, south, east, west, northeast, northwest, southeast and southwest.

6. The method of claim 4, wherein the text box is automatically determined by taking the minimum value of an x coordinate and a y coordinate corresponding to each of the points where the eight vectors cross an edge of the symbol.

7. The method of claim 1, wherein automatically determining the text box further comprises:
   determining the minimum number of line breaks needed to fit the text inside the text box;
   setting the center of the symbol as the minimum number of lines multiplied by the height of one line of text;
   setting the height of the text box as the minimum number of lines times the height of line of text; and
   setting the width of the text box as the maximum width of the box with the center and the height that fits comply into the symbol.

8. A system for rendering symbols with text, the system comprising:
   a processor; and
   a memory storing instructions that are adapted for causing the processor to perform a method comprising:
      selecting a symbol from a repository;
      providing text based on input from a user;
      combining the text with the symbol, wherein combining the text with the symbol comprises:
         automatically determining a text box within the symbol based on at least one characteristic of the text; and
      rendering the text combined with the symbol on a display, wherein the text is rendered inside the text box.

9. The system of claim 8, further comprising:
   defining one or more text boxes to insert into the symbol, wherein the text is inserted into the one or more boxes.

10. The system of claim 8, wherein automatically determining the text box further comprises:
    determining the center of the symbol.

11. The system of claim 10, further comprising:
    determining eight vectors from the center of the symbol, wherein the eight vectors are each a vector from the center of the symbol to the edge of the symbol in one of eight directions.

12. The system of claim 11, wherein the eight directions are north, south, east, west, northeast, northwest, southeast and southwest.

13. The system of claim 11, wherein the text box is automatically determined by taking the minimum value of an x coordinate and a y coordinate corresponding to each of the points where the eight vectors cross an edge of the symbol.

14. The system of claim 8, wherein automatically determining the text box further comprises:
    determining the minimum number of line breaks needed to fit the text inside the text box;
    setting the center of the symbol as the minimum number of lines multiplied by the height of one line of text;
    setting the height of the text box as the minimum number of lines times the height of line of text; and
    setting the width of the text box as the maximum width of the box with the center and the height that fits comply into the symbol.

15. A computer-readable medium comprising:
    programmable instructions configured to perform a method for rendering a symbol combined with text, comprising the following steps performed by a processor:
       selecting a symbol from a repository;
       providing text based on input from a user;
       combining the text with the symbol, wherein combining the text with the symbol comprises:

automatically determining a text box within the symbol based on at least one characteristic of the text; and rendering the text combined with the symbol on a display, wherein the text is rendered inside the text box.

16. The computer-readable medium of claim 15, further comprising:

defining one or more text boxes to insert into the symbol, wherein the text is inserted into the one or more boxes.

17. The computer-readable medium of claim 16, wherein the text box is automatically determined by taking the minimum value of an x coordinate and a y coordinate corresponding to each of the points where the eight vectors cross an edge of the symbol.

18. The computer-readable medium of claim 15, wherein automatically determining the text box further comprises:

determining the center of the symbol.

19. The computer-readable medium of claim 18, further comprising: determining eight vectors from the center of the symbol, wherein the eight vectors are each a vector from the center of the symbol to the edge of the symbol in one of eight directions.

20. The computer-readable medium of claim 19, wherein the eight directions are north, south, east, west, northeast, northwest, southeast and southwest.

* * * * *